(No Model.)
R. W. MILBANK.
PNEUMATIC ELEVATOR FOR GRAIN.
No. 310,905. Patented Jan. 20, 1885.
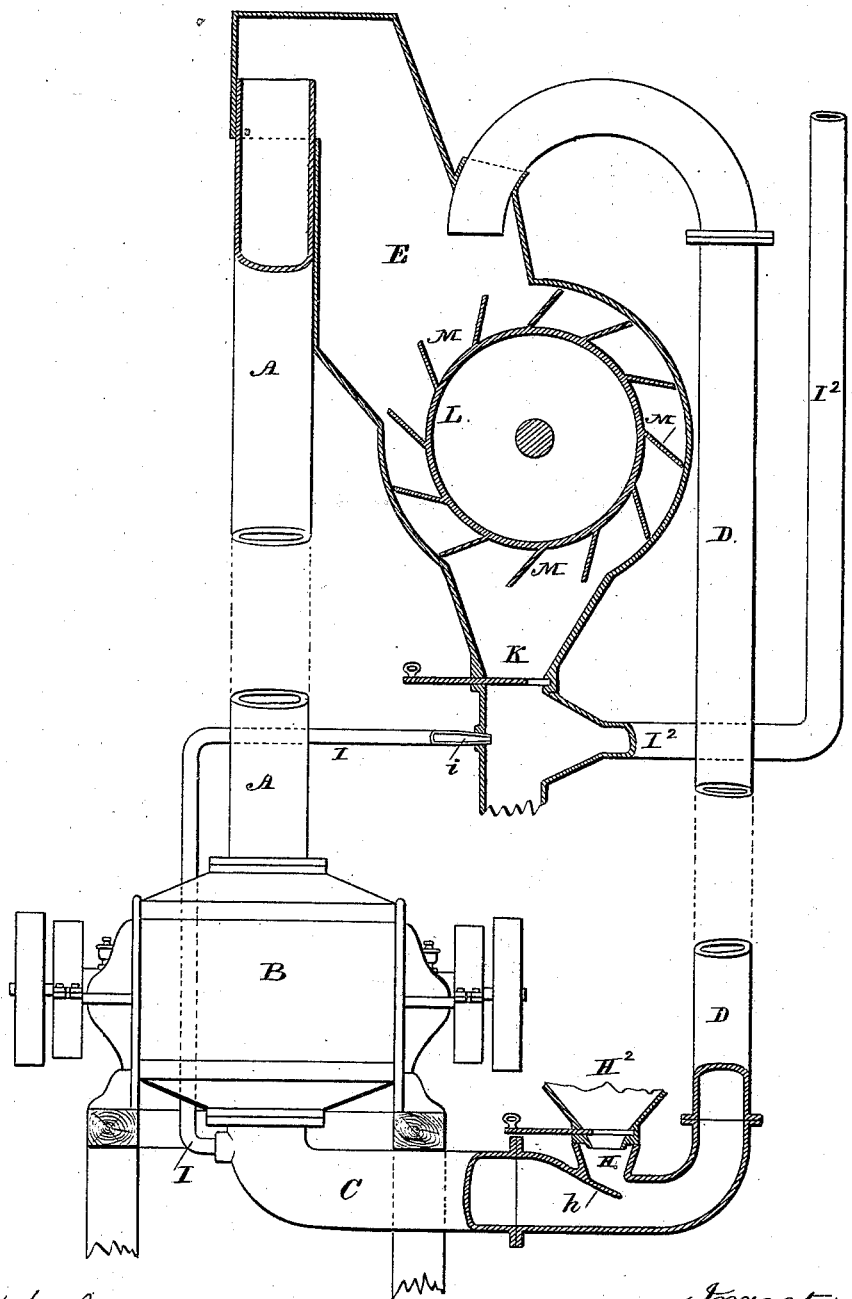

UNITED STATES PATENT OFFICE.

ROBERT W. MILBANK, OF NEW YORK, N. Y.

PNEUMATIC ELEVATOR FOR GRAIN.

SPECIFICATION forming part of Letters Patent No. 310,905, dated January 20, 1885.

Application filed April 14, 1884. (No model.)

*To all whom it may concern:*

Be it known that I, ROBERT W. MILBANK, of the city and State of New York, have invented an Improvement in Pneumatic Elevators for Grain, &c., of which the following is a specification.

Elevators for grain have been made in which a current of atmospheric air under pressure has been used to force up the grain through a pipe, and in other instances the atmosphere has been drawn up through such pipe by exhausting the bin into which the grain is discharged. Both these modes have their disadvantages. Where the blast of air is used to force up the grain in the elevator-tube, the same is liable to become obstructed by the grain being supplied too rapidly, and in the suction method, the bin being included in the exhaust, renders it difficult to discharge the grain.

My invention is made for obviating the difficulties before named, and for insuring the rapid elevation of the grain or similar material by atmospheric action. I make use of any suitable air pump or blower, and I employ both pressure and exhaust in causing the atmosphere to circulate rapidly and powerfully through the elevating apparatus, so that the grain may be elevated by a jet of atmosphere under pressure acting beneath it and a suction action above it, thereby preventing any cessation in the energy or force that is moving the grain.

In the drawing I have represented my improvement by an elevation of the same, some of the parts being in section. A blowing apparatus is shown at B. This may be of any desired character. The atmosphere is drawn into the same through the pipe A and forced out through the pipe C.

D is the elevator-pipe, up which the grain or other material is to be carried by the atmospheric action. The upper end of this pipe D is curved, and is nearly a semicircle, and opens at the lower end into the hopper or receptacle E. The pipe A opens into the top part of this hopper E, and at the bottom part of the hopper is a delivery-pipe, K, which may be provided with a slide to regulate the discharge.

The grain is supplied into the apparatus at the hopper or opening H, and it is preferable to employ a deflector, *h*, near this opening H, within the pipe C, so that the atmospheric air that is discharged from the blower by the pipe C passes by the opening H into the ascending pipe D. The atmosphere passing below the deflector *h* acts the same as the air or steam in an ejector, and causes the air to rush in at the opening H; and the grain passes in at the same time by gravity and by the suction action, and falls into the powerful blast as it moves along the pipe C and up the pipe D, to carry up the grain or other material in the pipe D. The suction action of the blower, drawing the air from the receptacle E through the pipe A, maintains a rapid and continuous circulation, which is very effective in moving the grain; but in the hopper or receiver E the atmosphere, while moving rapidly, will only be at about the ordinary pressure; hence the grain or other material will be freely discharged at the opening K. Sometimes it is desirable to regulate the discharge in proportion to the supply of grain into the hopper, and under all circumstances it is necessary to prevent the blower drawing the air in at the discharge-opening K, instead of aiding in the movement of the air in the pipe D. With this object in view I introduce into the hopper the wheel L, with buckets M around its periphery. The edges of these buckets nearly touch the interior of the hopper at the places where the same is made as segments of cylinders. This wheel is upon a shaft in suitable bearings, and as the atmospheric pressure will not tend to revolve it the same acts as a cut-off, to prevent the air being drawn up through the discharge-opening K to the pipe A, because the edges of the wheel fit so closely to the case of the bin; but said wheel can be easily rotated by the weight of the grain, because such grain is discharged into the buckets at one side only of the wheel. The buckets of this wheel may be made or lined with india-rubber, so as to lessen the concussion of the grain. It will now be understood that the blower exerts its power in elevating the grain to good advantage, because the force which has heretofore been expended in either drawing in the air or in expelling it, and which has been lost, is now utilized, because the air that is discharged aids in elevating the grain as well as that which is being drawn into the blower.

In order to remove from the grain any chaff or foreign substances, I make use of a blast of air taken from the pipe C by the pipe I, and directed, by a slot or mouth at $i$, across the descending grain as it is discharged from the opening K, and such chaff or dust is received into the discharge hood and pipe I², to be conveyed to the outside of the building in which the apparatus may be placed, or into a room or other receptacle. It is preferable to supply the grain into the opening H with regularity. For this purpose a hopper, H², and slide may be employed. The atmosphere can draw in at this opening to whatever extent is required by the action of the apparatus.

This apparatus may be placed on a vessel—as a floating elevator—and in order to adapt the same to the removal of grain from canal-boats or lighters the elevator-tube D may be swung from the top, so as to be moved at the bottom to any desired position, and the grain can be propelled in this tube D when the same occupies either a vertical or an inclined position, or it may be horizontal, or nearly so, for transferring grain. To accommodate these conditions the tube G may be extensible, or it may be flexible or otherwise conveniently connected from the blower to the lower end of the elevator-pipe D.

I do not claim an elevating apparatus in which the air is caused to circulate by a blower. In my apparatus, the horizontal pipe C having a deflector therein and a lateral opening above the deflector, the external atmosphere is admitted and acts with the internal atmosphere to pass in and move upwardly the grain or other material to be acted upon, it being important that the atmosphere shall be present in the elevating-pipe to act with the greatest energy upon the grain.

I claim as my invention—

1. In a pneumatic elevating apparatus for grain or other material, the combination, with the blower and the pneumatic elevating-tube, of a delivery-hopper, a suction-pipe extending from the delivery-hopper to the blower, and a tube extending from the lower end of the elevating-tube to the blower, through which the air from the blower is discharged, and an opening in the said tube through which air and the material pass, and a deflector in such tube, substantially as set forth.

2. In a pneumatic elevating apparatus, the combination, with the elevator-pipe D, the hopper E, and the pipe A, of a blower for drawing the air through the pipe A, a pipe, I, with a blast-mouth near the discharge K from the hopper E, for winnowing the material as it passes away from said hopper, and the air-blast pipe C from the blower to the lower end of the pipe D, substantially as set forth.

3. The combination, with the pneumatic elevator-tube D and blower B, of the pipe A, the hopper E, the wheel L, and buckets M, substantially as and for the purposes set forth.

Signed by me this 10th day of April, A. D. 1884.

ROBT. W. MILBANK.

Witnesses:
GEO. T. PINCKNEY,
WILLIAM G. MOTT.